(12) United States Patent
Werschler et al.

(10) Patent No.: US 12,017,559 B2
(45) Date of Patent: Jun. 25, 2024

(54) LONGITUDINAL SEAT ADJUSTMENT DEVICE, METHOD FOR ADJUSTING A SEAT, AND MOTOR VEHICLE WITH THE SAME LONGITUDINAL SEAT ADJUSTMENT DEVICE

(71) Applicant: IMS Gear SE & Co. KGaA, Donaueschingen (DE)

(72) Inventors: Marco Werschler, Radolfzell am Bodensee (DE); Robin Teichmann, Constance (DE); Marcel Mittelbach, Schluchsee (DE); Patrick Zahn, Bad Dürrheim (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 334 days.

(21) Appl. No.: 17/536,470

(22) Filed: Nov. 29, 2021

(65) Prior Publication Data
US 2022/0169153 A1    Jun. 2, 2022

(30) Foreign Application Priority Data
Nov. 30, 2020    (EP) .................................. 20210712

(51) Int. Cl.
*B60N 2/06*   (2006.01)
*B60N 2/02*   (2006.01)

(52) U.S. Cl.
CPC ............. *B60N 2/0244* (2013.01); *B60N 2/06* (2013.01)

(58) Field of Classification Search
CPC .... B60N 2/0244; B60N 2/06; B60N 2/02253; B60N 2/02258; B60N 2/0264;
(Continued)

(56) References Cited

U.S. PATENT DOCUMENTS 9,479,220 B2   10/2016   Julson et al.
2019/0351794 A1   11/2019   Huf et al.
(Continued)

OTHER PUBLICATIONS

DE 102020114817 A1 with English translation; date filed Jun. 4, 202; date published Dec. 10, 2020. (Year: 2020).*
(Continued)

*Primary Examiner* — Calvin Cheung
(74) *Attorney, Agent, or Firm* — Nath, Goldberg & Meyer; Jerald L. Meyer.; Morgan D. Rosenberg

(57) ABSTRACT

The present invention relates to a longitudinal seat adjustment device (1), comprising a rail (10) running along a longitudinal axis (X), a slide (20) with an electric drive device (40), by means of which the slide can be moved along the longitudinal axis (X) of the rail (10), and a first control unit (15) and a second control unit (25), wherein the first control unit (15) is fixedly connected to the rail (10) and the second control unit (25) is arranged on the slide (20), wherein the first control unit (15) and the second control unit (25) are connected via an electrical conductor (50) which can be energized by a voltage source (4) with a supply voltage (S1), wherein the second control unit (25) can control the drive device (40), and wherein the first control unit (15) and the second control unit (25) communicate via a communication signal (S2) that can be modulated to the supply voltage.

17 Claims, 3 Drawing Sheets

(58) Field of Classification Search
CPC ...... B60N 2/0272; B60N 2/0722; B60N 2/56; B60N 2/976; B60N 2/07; B60N 2/02246; B60N 2/0268; B60N 2/0296; B60N 2/067; B60R 16/027
See application file for complete search history.

(56) References Cited

U.S. PATENT DOCUMENTS

| | | |
|---|---|---|
| 2020/0189511 A1 | 6/2020 | Ricart et al. |
| 2020/0194936 A1 | 6/2020 | Ricart et al. |
| 2020/0262367 A1* | 8/2020 | Fernández Bañares .................... B60N 2/5678 |

OTHER PUBLICATIONS

DE 19829842 A1 with English translation, published Jan. 7, 1999. (Year: 1999).*
European Search Report dated Apr. 13, 2021 corresponding to application No. 20210712.4.

* cited by examiner

LONGITUDINAL SEAT ADJUSTMENT DEVICE, METHOD FOR ADJUSTING A SEAT, AND MOTOR VEHICLE WITH THE SAME LONGITUDINAL SEAT ADJUSTMENT DEVICE

The present invention relates to a longitudinal seat adjustment device with the features of claim 1, a method for adjusting a seat in a longitudinal axis of a motor vehicle with the features of claim 15, and a motor vehicle with the features of claim 17.

Longitudinal seat adjustment devices are known from the prior art in various embodiments and are commonly used in motor vehicles for adjusting the position of a seat in a longitudinal axis corresponding to the longitudinal axis of the vehicle. Longitudinal seat adjustment devices typically interact with a rail fixed on a chassis and a slide arranged within it, wherein the slide is motorized by means of a drive device and being coupled to the seat. In the prior art, the adjusting of the slide is typically carried out by means of a spindle which is arranged within the upper rail and is supported at its respective first end and second end.

Such longitudinal seat adjustment devices are known, for example, from DE 10 2006 052 936 A1.

It has been shown that the longitudinal seat adjustment devices known from the prior art have disadvantages for novel interior concepts of motor vehicles. In order to implement the novel interior concepts, large travel paths and higher travel speeds are required. Conventional longitudinal seat adjustment devices often form risk areas due to components protruding into the room.

This is where the present invention begins.

The object of the present invention is to propose a suitably improved longitudinal seat adjustment device which enables particularly long travel distances for the implementation of novel interior concepts and does not have any components which could protrude from the chassis and pose a potential risk. The present invention is also intended to contribute to weight reduction.

These objects are achieved by means of the longitudinal seat adjustment device with the features of claim 1, the method for adjusting a seat of a motor vehicle with the features of claim 15, and a motor vehicle with the features of claim 17.

Further advantageous embodiments of the present invention are specified in the dependent claims.

The longitudinal seat adjustment device according to the invention with the features of claim 1 has at least one rail running along a longitudinal axis and at least one slide with an electric drive device, through which the slide can be moved along the longitudinal axis of the at least one rail.

Furthermore, the longitudinal seat adjustment device according to the invention also has a first control unit and at least one second control unit, wherein the first control unit is arranged so as to be immovable or fixed in relation to the at least one rail and the at least one second control unit is arranged on the at least one slide and, in this respect, is movable by means of said at least one slide. Furthermore, the first control unit and the at least one second control unit are connected via a conductor, which can be connected to a voltage source, which energizes the conductor with a supply voltage. According to the invention, it is also provided that the at least one second control unit can control the drive device, and that the first control unit and the at least one second control unit communicate via a communication signal that can be modulated to the supply voltage.

The present invention is based on the idea that the first control unit and the at least one second control unit communicate via the one conductor via a powerline. Both the voltage supply of the electric drive device and possible further electrical devices which are located in or on the seat can be supplied with voltage via this one conductor, in which case control commands for controlling both the electric drive device and the other electrical devices can also be transmitted. Transmission can take place unidirectionally or bidirectionally.

By means of the present invention, it is possible to completely dispense with a trailing cable between the at least one rail and the associated slide. Trailing cables are not only an obstacle that can present risks, but are also susceptible to damage. In current vehicles, trailing cables comprise a plurality of conductors, which is why the present invention can contribute to a considerable reduction in weight.

The voltage source can be the on-board electrical system of a motor vehicle, which is typically operated with DC voltage. Current nominal voltages between 12-48 V are widespread, but electric motor vehicles in particular sometimes have significantly higher nominal voltages of up to 220 V, 400 V, or 900 V and more. Higher nominal voltages allow a cross-section reduction of the conductors and consequently a weight and cost saving.

The one conductor forms the voltage conductor and is set at potential, while a further zero conductor or neutral conductor can be provided, which is connected to the chassis or to the rail and the slide and whose electrical potential is close to the ground potential. The one conductor is preferably exclusively a conductor and is electrically uncoupled from the zero conductor or neutral conductor.

According to a preferred development of the present invention, the at least one rail has at least one propulsion means which can interact with the drive device in order to generate propulsion in the longitudinal axis. The at least one rail and/or the at least one propelling means is or are preferably embedded in a receptacle, wherein the receptacle can preferably be a recess which is embedded in the shape of a groove or pocket into a floor plane. Parallel to the longitudinal axis, the at least one propulsion means can be arranged in the receptacle—preferably receding or in an undercut region. In this case, the at least one propulsion means can be arranged even more preferably so as to be angled in a plane, preferably approximately perpendicular to the ground plane.

Furthermore, it has proved to be advantageous if the slide protrudes into the receptacle or if the slide is arranged in the receptacle. The slide is preferably arranged at least in some areas between two opposite longitudinal sides of the receptacle, wherein the propulsion means can be arranged on the at least one of the two opposite longitudinal sides. The slide can protrude from the receptacle into a passenger compartment of the motor vehicle via a driving pin and be connected to the seat or an upper rail of the seat.

Furthermore, it has proved to be advantageous if the at least one propulsion means comprises at least one toothed rack and that the drive device has at least two propulsion elements, which are successively inserted into or expelled out of the toothed rack, in order to generate propulsion in the longitudinal axis Such a linear drive is, for example, known from EP 19 178 264, PCT/EP 2020/065448, PCT/EP 2020/065453, and PCT/EP 2020/065454, and makes it possible to realize both large travel paths and high driving speeds with a break resistance necessary for motor vehicles.

The at least two propulsion teeth are preferably arranged in a stroke-movable transversely to the longitudinal axis and are drivingly coupled to a drive shaft of the electric drive device in such a manner that the at least two propulsion teeth perform at least one cyclic stroke movement in the course of a revolution of the drive shaft. To generate a propulsion in the longitudinal axis, the propulsion teeth dip into and are removed from the toothed rack. In other words, the respective propulsion tooth is inserted into and expelled out between two teeth of the toothed rack in each case. The cyclic stroke movement of the at least two propulsion teeth preferably takes place with a phase offset, wherein, here and in the following, a phase offset is understood as a dipping and removal of the at least two propulsion teeth into the toothed rack at different angles of rotation of the drive shaft.

Furthermore, here and in the following, a cyclic stroke movement is understood to mean a sequence of movements of a part or a complete cycle of the respective propulsion tooth, in which the propulsion tooth is dipped once from a starting point into the toothed rack and is completely removed from the toothed rack and returns to the starting point and vice versa. The respective propulsion tooth can go through one or more complete periods during one revolution of the drive shaft, wherein the number of periods always corresponds to an integer.

When the respective propulsion tooth is dipped into the toothed rack, the teeth and the propulsion teeth come into effective contact, which results in propulsion in the longitudinal axis. For this purpose, the respective propulsion tooth is dipped into the toothed rack or into a tooth gap between two teeth, wherein the propulsion tooth and the tooth come into effective contact on a friction surface, which is formed in the manner of a wedge surface, resulting in propulsion. To this end, it is necessary that at least one of the teeth and/or the propulsion teeth have a friction surface which is formed in the manner of a wedge surface.

Furthermore, it has proven advantageous if the at least one conductor comprises at least one conductor rail formed in the longitudinal axis of the rail and a gliding or sliding contact formed on the slide, which are in electrical operative connection. The conductor rail is arranged in relation to the chassis of the motor vehicle or the rail in an electrically insulated manner and has an electrically contactable contact surface, which is preferably directed into the receptacle. The gliding or sliding contact can also have means by which the gliding or sliding contact is pressed against the conductor rail in the shape of a current collector in order to ensure continuous electrical contact. By means of such a design of the conductor, it is possible to dispense with a trailing cable connection between the rail and the slide. This protocol can also save conductor track. Potential sources of risk from trailing cables are avoided and the travel path can be designed as long as desired.

According to a preferred development of the present invention, the conductor rail is arranged in the longitudinal axis on the at least one rail, in particular in the receptacle adjacent to the toothed rack. In particular, it is preferred if the at least one conductor rail is arranged in the receptacle in an undercut region, as a result of which the at least one conductor rail is protected from unintentional contact.

It is also advantageous if the supply voltage is a direct current which can be taken directly from the on-board electrical system of the motor vehicle.

In accordance with a further advantageous embodiment, the modulated communication signal is a frequency- and/or phase-modulated signal.

Furthermore, it is advantageous if the first control unit has an interface for receiving control commands, preferably from an ECU (electronic control unit) of the motor vehicle via CAN or LIN bus. The CAN bus (Controller Area Network) is a serial bus system and the LIN bus (Local Interconnect Network) is a serial communication system which is typically used for the networking of sensors and actuators in a motor vehicle. For example, the first control unit can receive control commands for adjusting the slide to a predetermined position in the longitudinal axis via the interface or control commands for other electrical devices arranged on or in the seat, such as seat heating, seat cooling, loudspeaker, headrest, lumbar support adjustment, seat height adjustment, backrest adjustment, and/or massage facilities. The further electrical devices may also comprise further actuators which, for example, enable the seat to be rotated about an axis of rotation perpendicular to a plane of the rail. As a result, the seats can be adjusted not only in the longitudinal axis of the rail or the motor vehicle but also with respect to their orientation. The seats can therefore be oriented toward the rear or to the side in some applications.

These control commands are modulated by the first control unit to the supply voltage as a communication signal and are transmitted by means of the conductor to the at least one second control unit. The at least one second control unit can demodulate the communication signal and further process the control commands.

Furthermore, it has proven to be advantageous if the first control unit is a master control unit and/or the at least one second control unit comprises at least one slave control unit for the drive device. The one conductor provides a single common transmission channel for the communication between the master control unit and the at least one slave control unit. By means of the hierarchical access management, the master control unit can solely communicate without request via the one conductor, whilst the slave control units are only allowed to communicate via the one conductor upon request by the master control unit. Polling can be used here, for example, in order to query and/or address the slave control units cyclically.

Further slave control units may be provided for the further electrical devices in each case.

It can also be advantageous if the at least one second control unit transmits at least one sensor signal to the first control unit. For example, the at least one sensor signal can be a functional state of the electric drive, or a functional state of the further electrical devices. The at least one sensor signal can also be a state of a belt, of person detection system, an airbag, or the like.

Furthermore, it has proven to be advantageous if the electric drive device has an encoder, and that the position of the slide on the rail in the longitudinal axis can be determined by means of the encoder. Alternatively or in addition, the position of the slide on the rail of the longitudinal axis can also take place via a runtime measurement of the communication signal. An intermediate storage of the position can take place in a non-volatile memory of the first and/or the at least one second control unit or in the encoder. Learning or reference trips can then be superfluous.

A further aspect of the present invention relates to a method for adjusting a seat with a longitudinal seat adjustment device, in particular with a longitudinal seat adjustment device described above, characterized by the method steps:

receiving a control signal by a first control unit, modulating the control signal as a communication signal to the supply voltage, receiving and demodulating the communication signal by the at least one second control unit, and replacing the control signal by controlling the electric drive device for the displacement of the slide in the longitudinal axis of the rail by means of the at least one second control unit with the supply voltage.

The control signal is preferably modulated from the first control unit as a communication signal to a DC supply voltage, in particular to the one conductor, and transmitted from the first control unit to the at least one second control unit. The first control unit is connected to the chassis of the motor vehicle in a stationary manner or arranged so as to be immovable with respect to the rail, and the at least one second control unit is connected in a stationary manner to the slide of the at least one rail.

A preferred development of the method provides that a position of the slide on the at least one rail in the longitudinal axis takes place on the basis of a signal transit time of the modulated control signal, and/or that a position of the slide in the longitudinal axis on the rail is determined on the basis of an encoder of the electric drive device.

A further aspect of the present invention relates to a motor vehicle having at least one above-described longitudinal seat adjustment device.

The motor vehicle preferably has a seat, further preferably at least two seats, and at least one longitudinal seat adjustment devices.

The longitudinal seat adjustment device also preferably has a slide, a rail, and at least a second control unit for each seat. The first control unit is connected to the at least one second control unit for the respective at least one seat, preferably via the conductor with the power source, i.e. the on-board electrical system. The preferably common first control unit of the longitudinal seat adjustment device can be connected by means of the interface with the ECU or the motor vehicle control unit and communicates with the second control unit via the conductor. Alternatively, the longitudinal seat adjustment device can also have a first control unit for each seat.

The ECU can simultaneously send control commands to the common first control unit. Thus, a plurality seats can be adjusted simultaneously and also synchronously in a motor vehicle for the implementation of novel seat concepts.

An exemplary embodiment of a longitudinal seat adjustment device according to the invention is described in detail below with reference to the accompanying drawing. In the drawings.

Figure 4:
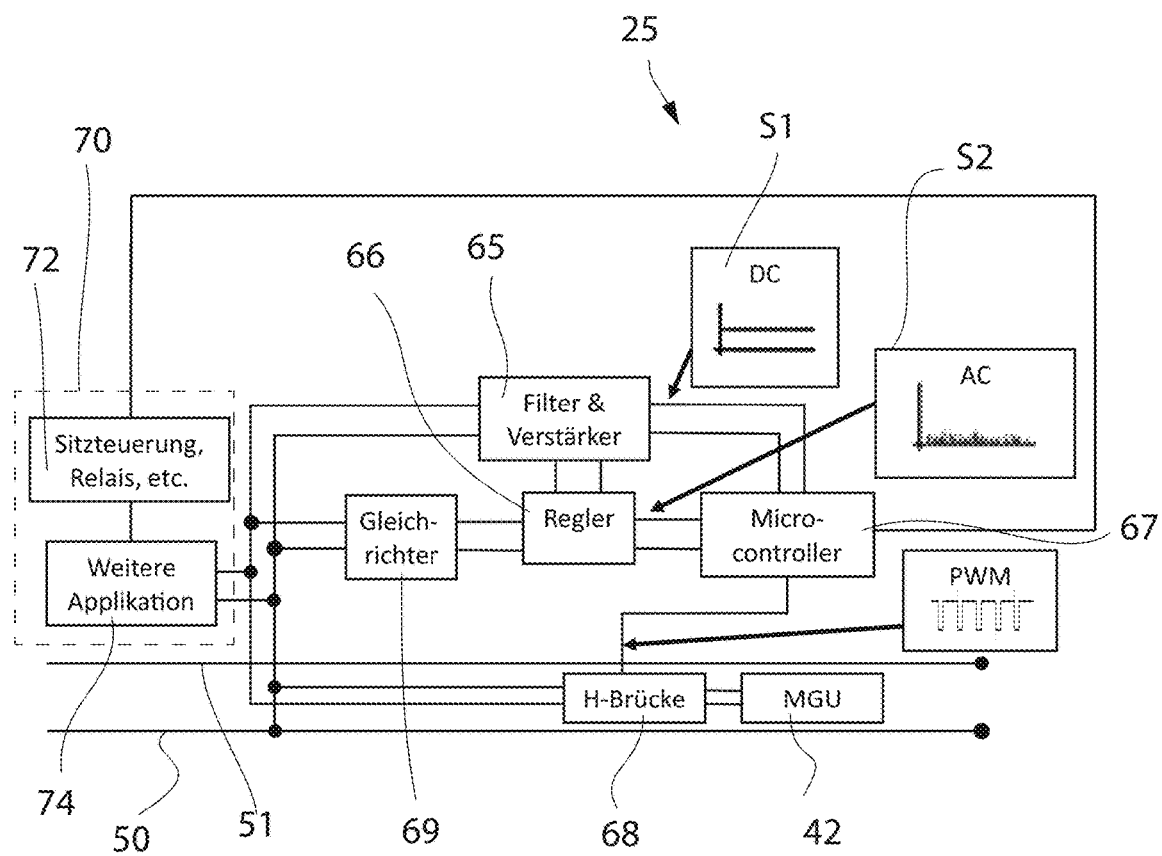
Figure 5:
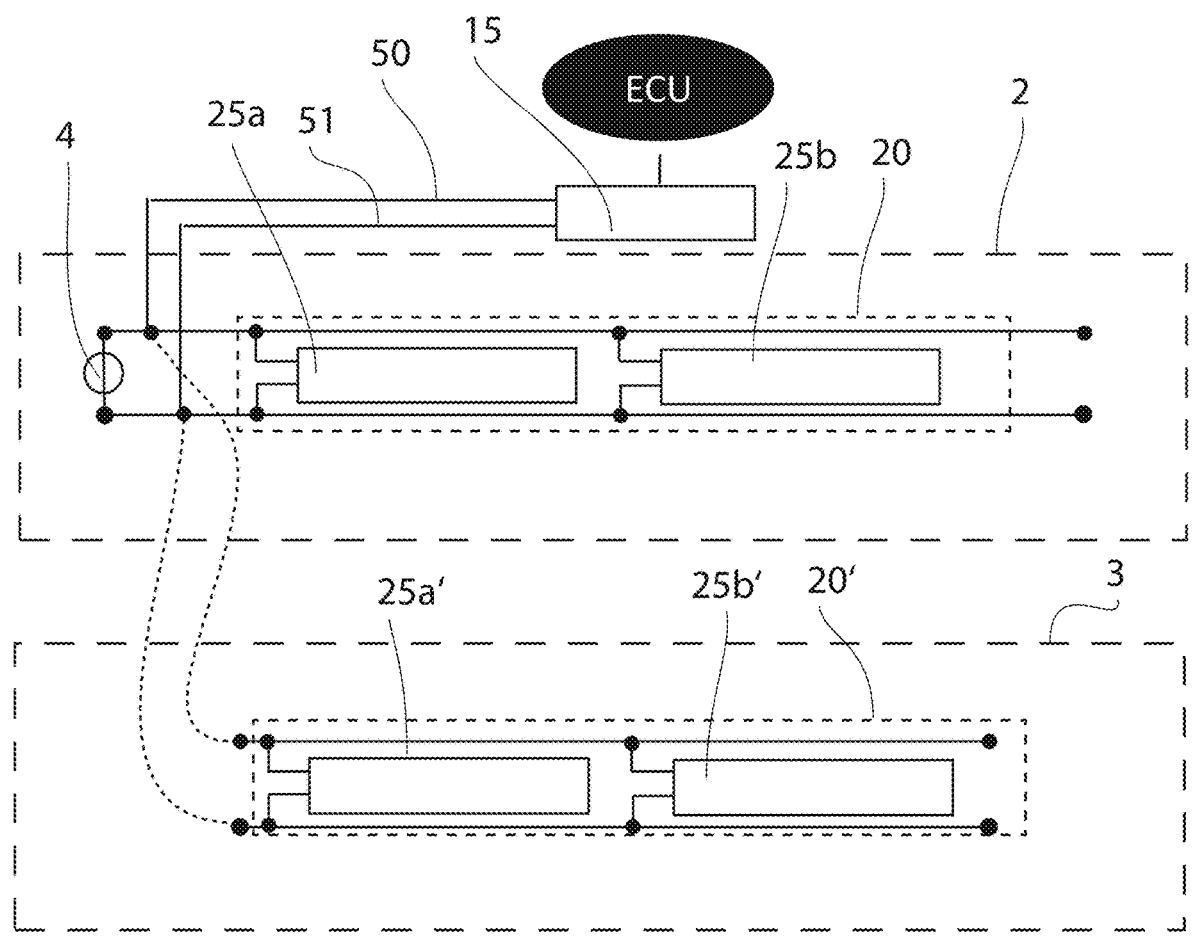

FIG. 4 shows a second development of the second control unit, wherein further devices are connected to the second control unit; and FIG. 5 shows a greatly simplified and schematic circuit diagram of a motor vehicle with two adjustable seats and a longitudinal seat adjustment device, wherein the longitudinal seat adjustment device has a common first control unit, which communicates with the second control units.

Identical or functionally identical components are identified below with the same reference symbols. For the sake of clarity, not all parts that are identical or functionally identical in the individual Figures are provided with a reference number.

Figure 1:
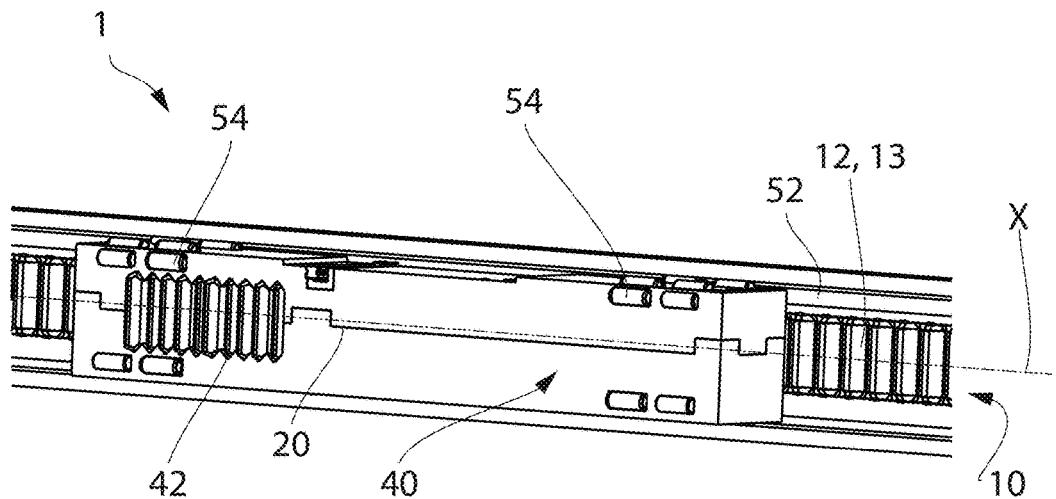
FIG. 1 shows a perspective, partially cut representation of the longitudinal seat adjustment device.

FIG. 1 shows a longitudinal seat adjustment device 1 according to the invention, having a rail 10, a slide 20, a first control unit 15, a second control unit 25, and a conductor 50. The slide 20 is arranged along a longitudinal axis X along the rail 20.

The rail 10 comprises a cuboid receptacle 11, which encloses a room at least partially. A propulsion means 12—preferably in the form of a toothed rack 13—can be arranged in each case on two diametrical longitudinal sides facing the room. The propulsion means 12 can be formed from a plurality of teeth, which are preferably arranged equidistantly along the longitudinal axis X. A corresponding tooth gap is formed between each two teeth.

The slide 20 can be arranged in the receptacle 11 or protrudes into the receptacle 11.

As can be seen further with reference to FIG. 1, the slide 20 has a housing which can receive an electric drive device 40 having an electric drive 42 (not shown).

The first control unit 15 is arranged so as to be fixed to the rail 10 or a chassis of the motor vehicle and the second control unit 25 is movable together with the slide 20 in the longitudinal axis X.

The first control unit 15 and the second control unit 25 are connected to one another via the conductor 50. The conductor 50 can be connected to a voltage source, which is preferably the DC on-board electrical system in the motor vehicle. The voltage source 4 can supply the conductor with a supply voltage S1. The conductor 50 is set to potential. A zero conductor 51 may be provided, which is either wired or attached to the mass of the longitudinal seat adjustment device 1 or the motor vehicle.

Furthermore, the first control unit 15 has an interface through which control commands, for example by the ECU or the control unit of the motor vehicle, can be received. The control commands or control signals S are preferably received via a CAN bus, LIN bus, or Flex Ray.

Figure 2:
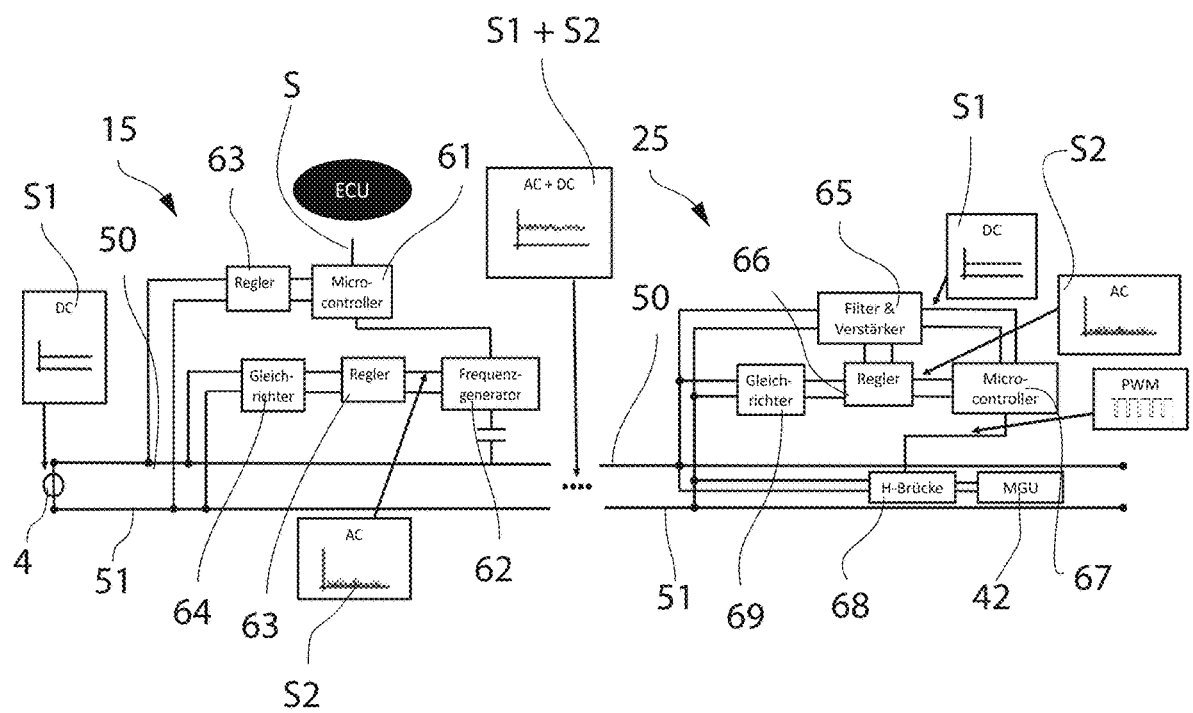
FIG. 2 shows a greatly simplified representation of a circuit diagram of the longitudinal seat adjustment device with a first control unit and a second control unit according to FIG. 1.

The first control unit 15 can modulate the control signals S received via the interface to the supply voltage S1 as a communication signal S2 and transmit them to the second control unit 25 via the conductor 50. This signal response is illustrated in FIG. 2 as "S1+S2".

The second control unit 25 can receive the communication signal S2 via the conductor 50, demodulate it, and process the control command. For this purpose, the second control unit 25 is connected to the electric drive 42 and can convert the received control signals S into a movement of the electric drive 42.

The electric drive 42 can drive a drive shaft (not shown). Furthermore, the drive device 40 has a plurality of propulsion elements 44, which are coupled to the drive 42 in such a way that the at least two propulsion elements 44 make at least one cyclic movement in the course of a revolution of the drive shaft and, in order to generate propulsion in the longitudinal axis X, can be dipped into and removed from the propulsion means 12 or, in other words, can be dipped into or removed from between two teeth of the toothed rack. The cyclic stroke movement of the at least two tooth-shaped propulsion elements 44 preferably takes place one after the other, i.e. with a phase offset, wherein, here and in the following, a phase offset is understood as a dipping and removal of the at least two propulsion elements 44 into the propulsion means 12 at different angles of rotation of the drive shaft.

The receptacle 11 can have end stops on end regions arranged on opposite sides in the longitudinal axis X, by means of which the maximum method path of the slide 20 within the space is specified.

The conductor 50 comprises a conductor rail 52 and at least one gliding or sliding contact 54 for forming an electrical connection between the conductor section which is movably arranged on the slide 20 in the longitudinal axis X and the conductor section which is arranged immovably on the rail 10 in the longitudinal axis.

The conductor rail 52 has an electrical contact surface on the side facing the room and preferably extends between the two end regions of the receptacle 11 in parallel with the longitudinal axis.

Furthermore, it can be seen from FIG. 1 that the gliding or sliding contacts 54 protrude from the housing. The gliding or sliding contacts 54 can be pre-tensioned by means against the conductor rail 52 for the electrical contacting of the conductor rail 52. The gliding or sliding contacts 54 are connected to the second control unit 25 and enable communication between the first control unit 15 and the second control unit 25.

The zero conductor 51 can be formed in a manner analogous to the conductor 50 with a conductor rail and gliding or sliding contacts. In the illustrated embodiment, the zero conductor is arranged on the side of the receptacle 11 opposite the conductor 50.

FIG. 2 shows a schematic circuit diagram of the first control unit 15 and the second control unit 25.

The first control unit 15 is a master control unit which communicates with the second control unit 25 via the conductor 50, wherein the second control unit 25 can have one or more slave control units which controls the consumers, i.e. the electric drive, or other electrical devices, such as seat heating or cooling, media playback devices, especially for on-board entertainment, massage devices, or other adjusting drives.

For receiving and processing the control signal S from the ECU, the first control unit 15 comprises a micro-controller 61, a frequency generator 62, a regulator 63, and a rectifier 64. The frequency generator 62 of the first control unit 15 is configured to generate a communication signal S2 corresponding to the control signal S, which can be modulated to the supply voltage S1 applied to the conductor 50.

The second control unit 25 may include filters and/or amplifiers 65, a regulator 66, micro-controller 67, H-bridges 68, and a rectifier 69 to demodulate the communication signal and, via a corresponding circuit, controls the electric drive 42 with a micro-controller and the H-bridge, preferably via pulse width modulation (PWM). A control can also be carried out via a relay.

Figure 3:
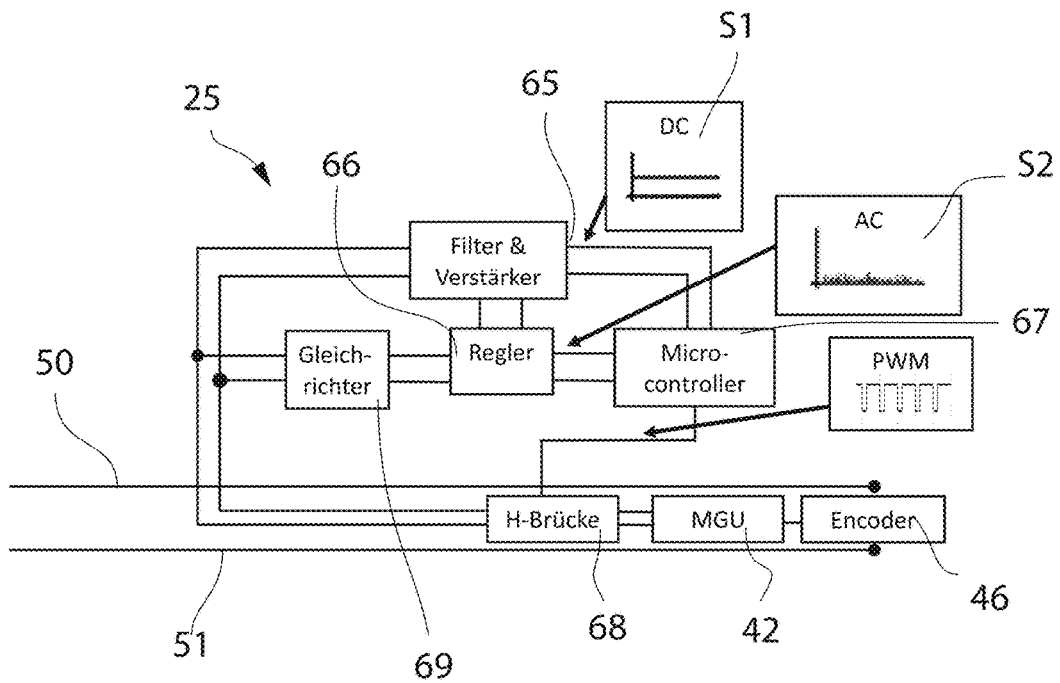
FIG. 3 shows a further development of the second control unit with an encoder for detecting the position of the slide in the longitudinal axis.

In order to determine the position of the slide 20 in the longitudinal axis X of the rail 10, as shown in FIG. 3, the electric drive 42 can have an encoder 46 which detects the revolutions of the electric drive 42. A signal transit time of the communication signal S2 can also be used to determine the position.

A further development of the second control unit 25 is shown in FIG. 4. The second control unit 25 can have a plurality of slave control units by means of which further electrical devices 70, such as seat heating, a massage function, further adjustable units, and the like can be controlled. The further electrical devices 70 are likewise supplied with a supply voltage S1 by means of the conductor 50, wherein, for example, one control of an application 74, such as a massage device, seat heating or cooling, or the like, can take place by means of a relay 72.

FIG. 5 shows a greatly simplified and schematic circuit diagram of a motor vehicle with two adjustable seats 2, 3 and a longitudinal seat adjustment device 1.

The longitudinal seat adjustment device 1 according to this embodiment can adjust the two seats 2, 3 simultaneously or in a time-offset manner. For the respective seat 2, 3, the longitudinal seat adjustment device 1 comprises a rail 10, a slide 20, 20', at least one second control unit 25, 25', and a drive device (not shown) 40, 40'.

Furthermore, as shown in FIG. 5, a plurality of second control units 25 can be provided, which are indicated by the reference symbols 25a, 25b, 25a' and 25b'. For example, the second control units 25a, 25a' can control the respective drive device 40, 40' and the second control units 25a, 25a' can control further electrical devices 70.

LIST OF REFERENCE NUMERALS

1 Longitudinal seat adjustment device
10 Rail
11 Receptacle
12 Propulsion means
13 Rack
15 First control unit
25 Second control unit
40 Drive unit
42 Drive
44 Propulsion element
46 Encoder
50 Conductor
51 Zero conductor
52 Conductor rail
54 Sliding contact
61 Controller
62 Frequency generator
63 Regulator
64 Rectifier
65 Amplifier
66 Regulator
67 Controller
68 H-bridge
69 Rectifier
70 Devices
X Longitudinal axis

The invention claimed is:

1. A longitudinal seat adjustment device (1), comprising:
a rail (10) running along a longitudinal axis (X);
a slide (20) with an electric drive device (40) through which the slide can be moved along the longitudinal axis (X) of the rail (10); and
a first control unit (15) and a second control unit (25),
wherein the first control unit (15) is arranged immovably with respect to the rail (10) and the second control unit (25) is arranged on the slide (20),
wherein the first control unit (15) and the second control unit (25) are connected via an electrical conductor (50) which is energized by a voltage source (4) with a supply voltage (S1) such that the first control unit (15) and the second control unit (25) are each directly powered by voltage source (4),
wherein the second control unit (25) is configured to control the drive device (40), and
wherein the first control unit (15) and the second control unit (25) communicate via a communication signal (S2) that is modulated over the supply voltage.

2. The longitudinal seat adjustment device (1) according to claim 1, characterized in that the rail (10) has at least one propulsion means (12) which can cooperate with the drive device (40) in order to generate propulsion in the longitudinal axis (X).

3. The longitudinal seat adjustment device (1) according to claim 1, characterized in that the at least one propulsion means (12) is embedded in a receptacle (11).

4. The longitudinal seat adjustment device (1) according to claim 3, characterized in that the driving means (12) include at least one toothed rack (13), and in that the drive device (40) has at least two propulsion elements (42), which can be successively inserted into and expelled from the toothed rack (13), in order to generate propulsion in the longitudinal axis (X).

5. The longitudinal seat adjustment device (1) according to claim 1, characterized in that the at least one conductor (50) comprises at least one conductor rail (52) formed in the longitudinal axis (X) of the rail (10) and a gliding or sliding contact (54) formed on the slide (20), which are in electrical operative connection.

6. The longitudinal seat adjustment device (1) according to claim 5, characterized in that the conductor rail (52) is arranged in the longitudinal axis X on the rail (10), in particular adjacent to the toothed rack (13).

7. The longitudinal seat adjustment device (1) according to claim 1, characterized in that the supply voltage is a direct current.

8. The longitudinal seat adjustment device (1) according to claim 1, characterized in that the modulated communication signal (S2) is a frequency and/or phase modulated signal.

9. The longitudinal seat adjustment device (1) according to claim 1, characterized in that the first control unit (15) has an interface for receiving control commands.

10. The longitudinal seat adjustment device (1) according to claim 1, characterized in that the first control unit (15) is a master control unit.

11. The longitudinal seat adjustment device (1) according to claim 1, characterized in that the second control unit (25) comprises at least one slave control unit for the drive device (40).

12. The longitudinal seat adjustment device (1) according to claim 1, characterized in that the second control unit (25) has at least one second slave control unit for lumbar support adjustment, seat height adjustment, backrest adjustment, seat heating, and/or a massage device.

13. The longitudinal seat adjustment device (1) according to claim 1, characterized in that the second control unit (25) transmits sensor signals to the first control unit (15).

14. The longitudinal seat adjustment device (1) according to claim 1, characterized in that the drive device (40) has an encoder (46), and in that, by means of the encoder (46), the position of the slide (20) is determined on the rail (10) in the longitudinal axis (X), and/or in that the position of the slide (20) is detected on the rail (10) in the longitudinal axis (X) by means of a runtime measurement of the communication signal (S2).

15. A method for operating a longitudinal seat adjustment device (1), comprising:
providing a rail (10) running along a longitudinal axis (X);
providing a slide (20) with an electric drive device (40) through which the slide can be moved along the longitudinal axis (X) of the rail (10); and
providing a first control unit (15) and a second control unit (25), wherein the first control unit (15) is arranged immovably with respect to the rail (10) and the second control unit (25) is arranged on the slide (20), wherein the first control unit (15) and the second control unit (25) are connected via an electrical conductor (50) which is energized by a voltage source (4) with a supply voltage (S1) such that the first control unit (15) and the second control unit (25) are each directly powered by voltage source (4), wherein the second control unit (25) can control the drive device (40), and wherein the first control unit (15) and the second control unit (25) communicate via a communication signal (S2) that is modulated over the supply voltage;
receiving a control signal (S) by the first control unit (15);
modulating the control signal (S) as a communication signal (S2) to the supply voltage (S1);
receiving and demodulating the communication signal (S2) by the second control unit (25); and
replacing the control signal (S) by controlling the drive device (40) for the displacement of the slide (20) in the longitudinal axis (X) of the rail (10) by the second control unit (25) with the supply voltage.

16. The method according to claim 15, characterized in that a position of the slide (20) in the longitudinal axis (X) on the rail (10) is detected on the basis of a signal transit time of the modulated control signal (S1).

17. The longitudinal seat adjustment device (1) according to claim 9, wherein the control commands are received from an electronic control unit via a controller area network bus or a local interconnect network bus.

* * * * *